United States Patent Office 3,189,609
Patented June 15, 1965

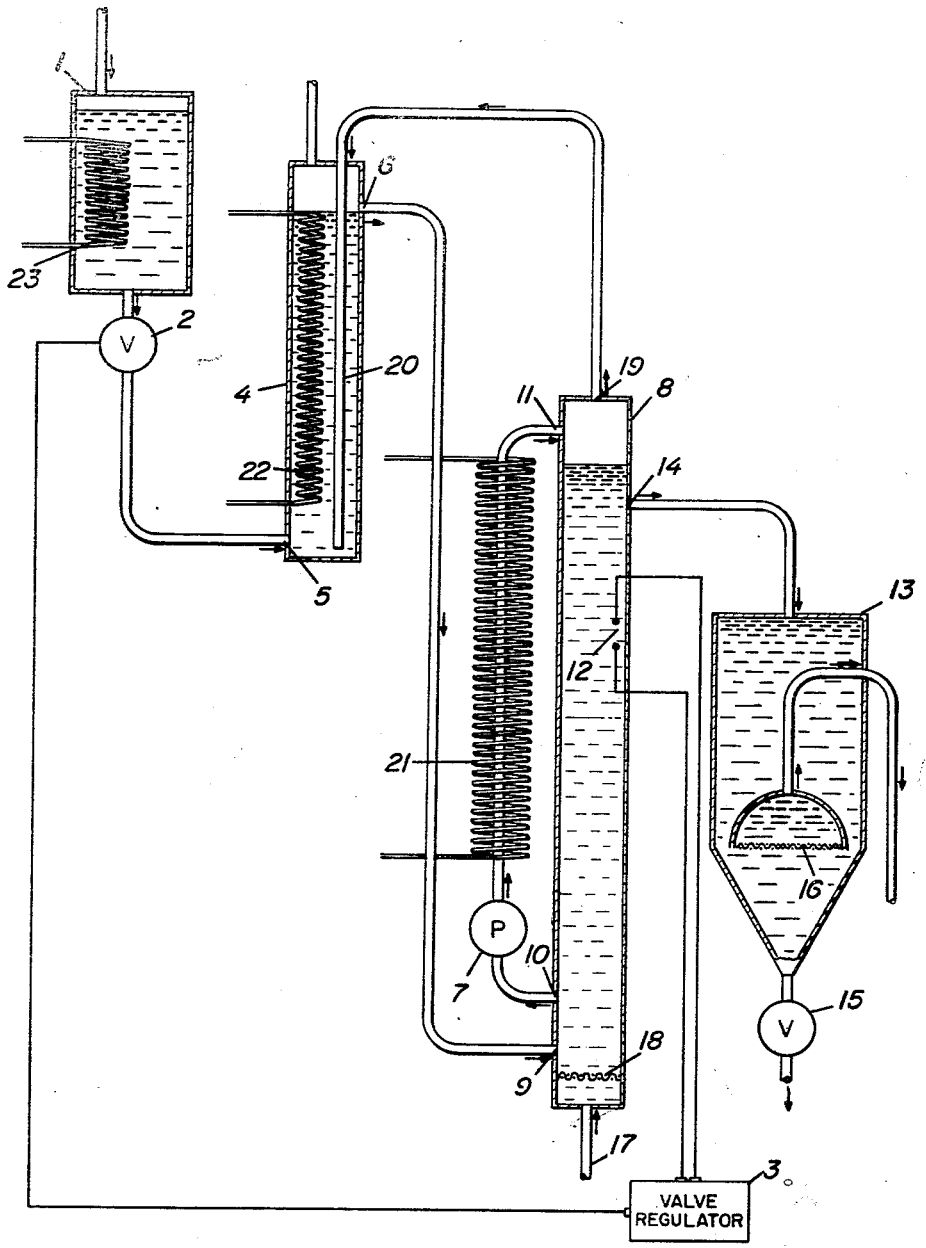

3,189,609
MANUFACTURE OF TRICHLOROCYANURIC ACID
Robert Léon Pierre Bécanne and Claude Jacques Henri Marie Pierre Ferrand, Haute-Garonne, France, assignors to Office National Industriel de l'Azote, Toulouse, Haute-Garonne, France
Filed Aug. 29, 1961, Ser. No. 134,759
Claims priority, application France, Dec. 19, 1960, 4,685
6 Claims. (Cl. 260—248)

The present invention is concerned with the manufacture of trichlorocyanuric acid, and involves the embodiment of a particular method of operation for this purpose as well as the corresponding apparatus.

It is known to prepare trichlorocyanuric acid by the action of chlorine gas on an aqueous solution of cyanuric acid and an alkaline hydroxide in a molar ratio of 1:3, while maintaining the pH of the reaction medium below 4.5 and the temperature between 0° C. and ambient temperature. The resultant trichlorocyanuric acid crystallizes and is drawn off rapidly from the mother liquor to avoid hydrolysis and/or decomposition of the crystalline product before ultimately subjecting it to purification.

The known procedures of this type are bound up with many drawbacks and disadvantages which prejudice industrial exploitation. The drawbacks of the majority of such known processes which are ascribable to the fact that impure products are obtained which are not, without subsequent purification, suitable for most uses. The yields obtained with such processes are far from quantitative, and generally can be improved only by extensive and expensive re-cycling of mother liquor. Moreover, these known processes generally require the use of complicated mechanical stirring apparatus.

In addition, in view of the very long contact time between the reactants and the reaction products customarily involved in these known processes, which are generally carried out in batch operation, such operation must be carried out in low-volume equipment so as to reduce to a minimum the risks connected with the development of unavoidable secondary reaction.

Finally, the known processes depend on control of pH to regulate the reaction process, whereas by the very nature of the reactions, the pH can not provide a true sensitive and accurate indication of the state of the system.

A primary object of the present invention is the embodiment of a process for the manufacture of trichlorocyanuric acid which, while it involves the reaction of chlorine gas with an aqueous alkaline solution of cyanuric acid and an alkaline hydroxide in a molar ratio of 1:3, can be carried out without entailing any of the aforedescribed prior art drawbacks and disadvantages.

Briefly stated, this object is realized according to the present invention by a novel combination of the expedients, the most significant and determinative of which is that of keeping the oxidation-reduction potential (redox-potential) of the reaction solution at a substantially constant value during the last stage of chlorination; this value corresponds to a potential value in the range from 1050 to 1150 millivolts, and preferably at about 1100 millivolts, as measured between a platinum electrode and a 1.0 M (or normal) KCl-calomel electrode, as will hereinafter more especially be described. As will hereinafter appear, other suitable electrode systems may also be employed within the scope of the present invention.

More specifically, it is a preferred characteristic of the invention that the chlorination is carried out in two or more successive stages, pre-chlorination of the starting solution being carried out by unreacted chlorine from the final chlorination stage, during which stage the trichlorocyanuric acid crystallizes and the oxidation-reduction potential measurements, necessary to maintenance of the above-described value are made.

The aforesaid novel combination of expedients, whereby the hereinafter enumerated results are achieved, consists of the following expedients applied to a process for manufacturing the desired trichlorocyanuric acid by chlorination of an aqueous solution cyanuric acid and an alkaline hydroxide, the molar ratio of cyanuric acid to alkaline hydroxide being 1 to 3:

(a) the temperature of the reaction medium is between 0 and 16° C., the latter being a critical upper limit for maximum yield and maximum purity of product according to the present process;

(b) the oxidation-reduction potential, as measured between a platinum electrode and a 1.0 M (or normal) KCl-calomel electrode, in a preferred embodiment, is fixed within 5 millivolts at a value between 1050 and 1150 millivolts during the latter of the two chlorination stages employed; and (c) the concentration of the initial aqueous cyanuric acid solution is from 20 to 30 grams per liter. In addition, (d) the time of contact between the reaction partners can vary widely without prejudice; a time of contact between 1 and 38 minutes—the here-preferred range—is thus made possible.

When thus operating according to the present invention, the resultant product is of a purity in excess of 98%, whereby the necessity for any further purifying operation is avoided. Moreover, the yield of trichlorocyanuric acid is in excess of 93%, in relation to the initial quantity of cyanuric acid, and is at least 88% in relation to the chlorine employed. Additionally, the process (1) can be carried out in a simple operation and may be, and preferably is, carried out without recycling the spent solution; and (2) it can be, and preferably is, carried out in continuous operation under automatic control. The process, due to the essentially complete suppression of undesired reactions, engenders no by-products which may give rise to the formation of explosive substances, and is thus characterized by complete safety. Efforts have heretofore been made to avoid the formation of explosive substances, by the use of purified initial cyanuric acid.

As compared with prior processes depending on control of pH to regulate the progress of the reaction and in which there is a critical narrow reaction period which may not be exceeded without involving reduction in yield due to decomposition, the period of reaction according to the process of the present invention can be varied within wide limits without giving rise to any decomposition reaction. Moreover, whereas the pH varies with e.g. initial concentration of the cyanuric acid, there is only one redox potential value which will enable optimum results to be realized according to the invention, regardless of initial concentration of the cyanuric acid. As indicated, however, the invention requires an initial concentration of cyanuric acid of between 20 and 30 grams per liter, from the standpoint of maximum yield. Furthermore, regulation of the reaction in dependence on redox potential makes possible, in simple and certain manner, the automatization of the continuous process according to this invention, a factor which is of considerable technical significance.

The invention also includes an apparatus for carrying out the process of the invention. Such apparatus may, for example, be regulated by making the supply of one of the reagents dependent on the oxidation-reduction potential of the system. The supply of the other reagent may then be used as a pilot-flow and can either be kept constant, or be made responsive to another control variable, such as the chlorine content of the residual gases. Such regulation can be effected by one or several automatic valves controlled in per se conventional manner by apparatus for measuring the oxidation-reduction potential. Thus for a fixed oxidation-reduction potential, the production capacity of the apparatus depends only on the pilot-flow. This capacity may be varied for a given apparatus, thus imparting to the apparatus great flexibility of use. Such apparatus may conveniently comprise a supply reservoir for the solution of cyanuric acid and alkaline hydroxide, a first chlorinator column to the lower portion of which the solution flows and into which the gaseous chlorine is admitted, a gas outlet and a chlorinated solution overflow in the upper portion of the first chlorinator, a second chlorinator having in its lower portion a prechlorinated solution inlet supplied from said overflow and a chlorine gas inlet, separate gas and chlorinated solution outlets in the upper portion of the second chlorinator, by-pass means to cycle a portion of the chlorinated solution in the second chlorinator in counterflow to the gas and to the reminder of the solution therein, means to maintain the solution in the chlorinators at the required temperature (0–16° C.), means to measure continuously the oxidation-reduction potential of the solution in the second chlorinator, and means supplied with chlorinated solution from the second chlorinator overflow for separating from the solution the trichlorocyanuric acid contained therein.

For example, a controlled flow of an aqueous solution of cyanuric acid and sodium hydroxide containing 0.2 mole of cyanuric acid and 0.6 mole of sodium hydroxide per liter may be introduced into the first of the two series-connected chlorinators.

Each chlorinator may e.g. have a volume of 7.30 liters, the average flow per hour of the solution being regulated to 52.1 liters, by the action of an electromagnetic valve the opening of which is remote controlled by means of a regulating device so that the oxidation-reduction potential, in the second chlorinator, which is measured e.g. between a platinum electrode and a 1.0 M (or normal) KCl-calomel electrode, is kept at 1100±5 millivolts. The flow of molecular chlorine is maintained strictly constant at 3.10 kg. per hour.

An efficient refrigerating system is preferably provided to enable the temperature to be maintained in the two chlorinators at 13±1° C.

The reaction product will be precipitated in the second chlorinator in the form of a crystal paste which is then continuously separated from the spent solution in a decanting apparatus. After centrifuging, washing in water, and drying, an average output of 2.28 kg. per hour of trichlorocyanuric acid of 99.4% purity is obtained over a period of 24 hours of continuous operation. With such operation, the mean yield calculated on the basis of the original cyanuric acid amounts to 93.5% and, on the basis of the chlorine, 88%.

It will be pointless to re-cycle spent solution since this is free of capability of forming additional trichlorocyanuric acid.

As previously stated, a presently preferred electrode system for use in carrying out the present invention is the aforementioned platinum/KCl-calomel electrodes system, using the 1050 to 1150 millivolts redox potential value. However, it is within the scope of the invention to use any other convenient and readily available known system of electrodes such for example as platinum/calomel-KCl (saturated), platinum/Ag—AgCl—KCl (1.0 M), platinum/Hg—HgO—NaOH (1.0 M) and the like. The temperature conditions, initial concentration of cyanuric acid, and other described features of the procedure according to this invention remain the same regardless of the particular electrodes system employed. The only thing that changes is the optimum potential redox value. Such value can be determined without difficulty with reference the disclosed values for the preferred platinum/calomel-1.0 M KCl system, by reference to any standard text of comparative standard values (constants) for such electrode systems; see for example page 752 of Vol. II, Part 7 of Landolt-Börnstein's Physikalisch-Chemischen Tabellen, 6th (1950) Edition, published Springer-Verlag, Berlin (1960).

The measurement per se of the redox potential is not part of the present invention, such measurement being in itself known to those skilled in the art and being described in numerous standard physical chemistry texts, such for example as Oxidation-Reduction Potentials of Organic Systems by W. Manfield Clark (The Williams & Wilkins Company, Baltimore), of which page 295 et seq. are especially relevant in this regard.

The following is a detailed description of a presently preferred exemplary embodiment of the invention, reference being made in this regard to the accompanying sheet of drawing showing in diagrammatic form an apparatus as aforesaid for carrying out the process of the invention under the previously specified operating conditions:

The aqueous solution of cyanuric acid and of an alkaline hydroxide, as precedingly defined, is introduced into tank 1, which is kept full and which feeds continuously a series of chlorinators 4 and 8; although but two chlorinators are shown, additional chlorinators may be employed. The chlorinators may be any conventional type of apparatus which ensures that good gas/liquid contact is obtained in the process and thereby effects substantially total absorption of the chlorine introduced.

The flow of original solution into the chlorinating apparatus is regulated by valve 2 controlled by a remote regulating device 3.

This solution is introduced at 5 into the lower portion of chlorinator 4 through which it flows upwards and which it leaves by the overflow 6, whence it flows by gravity to the lower portion 9 of chlorinator 8. The crystals suspended in the solution in chlorinator 8 are agitated from bottom upwards by the flow of gaseous chlorine. This agitation may also be effected in the opposite direction by means of a circulating pump 7 which withdraws a part of the solution at 10 and returns it at 11, ensuring thereby continuous circulation of the trichlorocyanuric acid crystals suspended in the solution in chlorinator 8.

Owing to this circulation, the platinum-calomel couple 12 of the regulating device 3 registers the average oxidation-reduction potential of the solution present in the chlorinator 8. The crystal paste pours off continuously into decanter 13 through overflow 14. The product is recovered continuously via valve 15 and the spent liquor is drawn off by means of filtering device 16.

At the same time a constant flow of gaseous chlorine is introduced through pipe 17 opening into the lower portion of chlorinator 8 and is uniformly distributed in the cyanuric acid solution by means of distributing device 18. Unreacted chlorine leaves the chlorinator 8 at 19 and is introduced into the solution in chlorinator 4 by means of tube 20.

The temperature of the reaction medium is maintained constant at a value between 0 and 16° C. by means of a per se conventional cooling system shown diagrammatically as coils 21, 22 and 23.

While the preferred couple 12 is constituted by the aforementioned platinum/calomel-1.0 M KCl electrodes system, using its optimum redox potential value of 1050 to 1150 millivolts, such system can equally as well be replaced by any other of e.g. the afore-enumerated electrodes systems. For each such system the redox potential is maintained at substantially its particular characteristic optimum value.

Having thus disclosed the invention, what is claimed is:

1. In a process for the preparation of trichlorocyanuric acid by the multi-stage chlorination of an aqueous solution of cyanuric acid and alkaline hydroxide wherein the molar ratio of cyanuric acid to alkaline hydroxide is 1:3, the improvement of carrying out the chlorination at a temperature which is minimally 0° C. and maximally 16° C. and at a substantially constant average oxidation-reduction potential value in the reaction medium in the last chlorination stage, said value corresponding to a potential comprised between 1050 and 1150 millivolts, as measured between a platinum electrode and a 1.0 M KCl-calomel electrode.

2. In a process for the preparation of trichlorocyanuric acid by the multi-stage chlorination of an aqueous solution of cyanuric acid and alkaline hydroxide wherein the molar ratio of cyanuric acid to alkaline hydroxide is 1:3, the improvement of carrying out the chlorination at a temperature which is minimally 0° C. and maximally 16° C. and at an average oxidation-reduction potential value, which has a maximum variation of 5 millivolts, in the reaction medium in the last chlorination stage, said value corresponding to a potential comprised between 1050 and 1150 millivolts, as measured between a platinum electrode and a 1.0 M KCl-calomel electrode.

3. In a process for the preparation of trichlorocyanuric acid by the multi-stage chlorination of an aqueous solution of cyanuric acid and alkaline hydroxide wherein the molar ratio of cyanuric acid to alkaline hydroxide is 1:3, the improvement of carrying out the chlorination at a temperature which is minimally 0° C. and maximally 16° C. and at a substantially constant average oxidation-reduction potential value in the reaction solution in the last chlorination stage, said value corresponding to a potential of $1100 \pm 5$ millivolts, as measured between platinum electrode and a 1.0 M KCl-calomel electrode.

4. In a process for the preparation of trichlorocyanuric acid by the multi-stage chlorination of an aqueous solution of cyanuric acid and alkaline hydroxide wherein the molar ratio of cyanuric acid to alkaline hydroxide is 1:3, the improvement of carrying out the chlorination at a temperature which is minimally 0° C. and maximally 16° C. and at a substantially constant average oxidation-reduction potential value in the reaction solution in the last chlorination stage, said value corresponding to a potential comprised between 1050 and 1150 millivolts, as measured between a platinum electrode and a 1.0 M KCl-calomel electrode, and with a concentration of cyanuric acid in the initial aqueous solution of between 20 and 30 grams per liter.

5. A process for the preparation of trichlorocyanuric acid comprising in a first stage chlorinating an aqueous solution of cyanuric acid and alkaline hydroxide in which the cyanuric acid has a concentration of between 20 and 30 grams per liter and the molar ratio of acid to hydroxide is 1:3, repeating the chlorination in at least one subsequent stage wherein the solution being chlorinated is the chlorinated solution of the preceding stage, maintaining the temperature of chlorination at 0 to 16° C. throughout the process, and in the final chlorination stage maintaining a substantially constant average oxidation-reduction potential value in the range between 1050 and 1150 millivolts, measured between a platinum electrode and a 1.0 M KCl-calomel electrode.

6. In a process for the preparation of trichlorocyanuric acid by the multi-stage chlorination of an aqueous solution of cyanuric acid and alkaline hydroxide wherein the molar ratio of cyanuric acid to alkaline hydroxide is 1:3, the improvement of carrying out the chlorination at a temperature which is minimally 0° C. and maximally 16° C. and at an optimum substantially constant average oxidation-reduction potential value in the reaction medium in the last chlorination stage.

References Cited by the Examiner

UNITED STATES PATENTS

| | | | |
|---|---|---|---|
| 2,664,341 | 12/53 | Kesting | 23—260 |
| 2,704,703 | 3/55 | Hesson | 23—260 |
| 2,820,812 | 1/58 | Lichtenberger et al. | 23—260 X |
| 2,913,460 | 11/59 | Brown et al. | 260—248 |
| 2,969,360 | 1/61 | Westfall | 260—248 |

OTHER REFERENCES

Daniels et al.: Physical Chemistry, Second Ed., 1961, J. Wiley and Sons, Inc., New York.

WALTER A. MODANCE, *Primary Examiner.*

IRVING MARCUS, NICHOLAS S. RIZZO, *Examiners.*